United States Patent [19]

Masson et al.

[11] 3,737,770
[45] June 5, 1973

[54] MICROWAVE THICKNESS MEASURING DEVICE UTILIZING TWO RESONANT CAVITIES ON EITHER SIDE OF THE TEST PIECE

[75] Inventors: Maurice Masson, Grenoble; Raymond Warlop, Pont-de-Claix, both of France

[73] Assignee: Commissariat A. L'Energie, Paris, France

[22] Filed: Nov. 27, 1970

[21] Appl. No.: 93,235

[30] Foreign Application Priority Data
Dec. 8, 1969 France..................................6942381

[52] U.S. Cl. ..........................................324/58.5 C
[51] Int. Cl. ..............................................G01r 27/04
[58] Field of Search....................324/58, 58.5, 83 A

[56] References Cited

UNITED STATES PATENTS

| | | |
|---|---|---|
| 3,005,165 | 10/1961 | Lenigan...........................324/83 A |
| 2,964,703 | 12/1960 | Sargent et al.....................324/58.5 |
| 3,514,703 | 5/1970 | Soga..................................324/58.5 |
| 3,484,685 | 12/1969 | Murley, Jr. .......................324/58.5 |

FOREIGN PATENTS OR APPLICATIONS

| | | | |
|---|---|---|---|
| 1,173,438 | 10/1969 | Great Britain | ...................324/58.5 C |
| 1,197,699 | 7/1970 | Great Britain | ...................324/58.5 C |

*Primary Examiner*—Robert J. Corcoran
*Attorney*—Cameron, Kerkam & Sutton

[57] ABSTRACT

A device for measuring a displacement or the thickness of a sheet comprises a microwave test cavity resonator whose resonance frequency is controlled by said displacement or thickness and a microwave reference cavity resonator. A saw tooth modulated microwave generator supplies microwave energy to both cavities. First and second detector means detect the transmission of power by the test cavity and the reference cavity respectively and the volume and resonance frequency of the reference cavity are automatically adjusted in order to cause said transmissions to coincide in time.

2 Claims, 9 Drawing Figures

MICROWAVE THICKNESS MEASURING DEVICE UTILIZING TWO RESONANT CAVITIES ON EITHER SIDE OF THE TEST PIECE

This invention relates to the devices for measuring a displacement in which the displacement is used for modifying the size of a VHF resonant cavity, of the type disclosed in British Pat. No. 1 173 438 :

According to British Pat. No. 1 173 438 the displacement modifies the length of a test cavity resonator which is supplied at microwave frequencies by a generator. In the embodiment which is illustrated in FIG. 1 of the British patent, the test cavity resonator is connected through a directional coupler to a reference cavity and to a detector. The output voltage of the detector is displayed on the screen of an oscilloscope, the sweep voltage of which serves to modulate said microwave generator. The reference cavity is closed by a movable wall which can be displaced by a micrometer ; the measurement is taken by causing the absorption peaks resulting from the two cavities as displayed on the screen of the oscilloscope to coincide at the beginning and at the end of the displacement and by reading the displacement of the micrometer between the two positions. This first embodiment has a disadvantage in that it requires the presence of an operator.

In a second embodiment which is illustrated in FIG. 4 of the British patent, the device comprises an electronically tunable microwave generator which supplies the test cavity and a detector which is responsive to the amplitude of the microwave reflected from said test cavity. A device which automatically controls the frequency of the generator and is coupled to the detector serves to modulate the frequency of the generator in dependence on the resonant frequency of the test cavity. A microwave frequency-meter which is connected to the output of the generator through a magic-tee junction determines the frequency changes representing the displacements to be measured.

This second embodiment has the advantage of providing automatic operation. On the other hand, this embodiment entails the use of a microwave frequency-meter which is a costly item of equipment. This disadvantage is removed in the first French certificate of Addition No 94 942 and in British Pat. No 1 197 699. In this device, provision is made for a loop which controls the resonant frequency of the standard cavity in dependence on the frequency of the wave produced by the generator by automatically modifying the dimensions of said standard cavity. To this end, said cavity can have a wall which is movable by means whose displacement can readily be measured (such as a micrometer, for example).

This solution offers an advantage over the previous form of construction but nevertheless carries a penalty in that it entails the need for two control loops (one loop for holding the frequency of the generator to the resonant frequency of the test cavity, the other loop for controlling the resonant frequency of the standard cavity in dependence on the frequency of the generator).

The object of this invention is to provide a displacement-measuring device which complies with practical requirements more effectively than comparable devices of the prior art, especially insofar as it is not subject to the drawbacks mentioned above. With this objective, the invention proposes a displacement-measuring device for varying the volume of a test cavity which is resonant at microwave frequency and comprising a microwave generator which supplies said test cavity and a reference cavity and means for frequency modulating the generator by a sawtooth voltage. said device essentially comprises a first and a second detector for detecting the transmission of power respectively by the test cavity and the reference cavity and control means for adjusting the volume of the reference cavity in order to cause said transmissions to coincide.

The device hereinabove defined makes it possible both to follow continuously the displacements or deformations of an object by constituting the movable element which predetermines the volume of the cavity by means of a surface either of said object or of a piston which is coupled with said object and to compare the dimensions of different objects which predetermine the successive positions of said element. In the second case, provision is usefully made for two test cavities which are symmetrical with respect to the objects in accordance with an arrangement which is similar to that described in British Pat. application No 9630/70 for a patent of Addition.

A more complete understanding of the invention will be gained by consideration of the following description of two exemplified embodiments which are given without implied limitation, reference being made to the accompanying drawings, in which.

Figure 1:
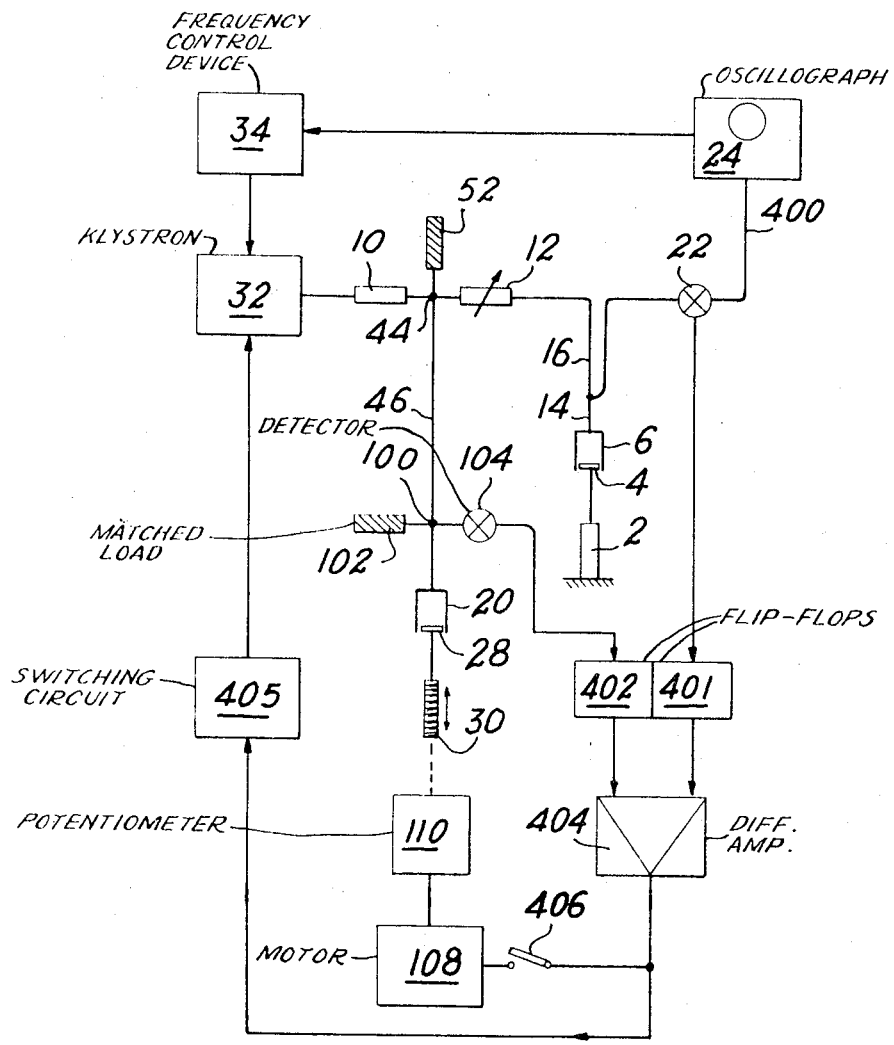
FIG. 1 is a block diagram of a first embodiment of the invention and represents a device for measuring the displacements of the end surface of a sample.

In the device shown in FIG. 1, the components which correspond to those of the device described in British Pat. of Addition No. 1 197 699 are designated by the same reference numeral for the sake of simplicity. There is again shown in the diagram of FIG. 1 a deformable sample 2, the extremity of which is capable of displacement and is rigidly fixed to the piston 4 of a test cavity 6. Said test cavity is supplied by a generator 32 which operates at microwave frequency (e.g., a reflex klystron oscillator) by means of a decoupling network and an attenuator 12. A crossed waveguide coupler or magic-tee junction 44 is interposed between the decoupling network and the attenuator 12. The third guide terminal of the junction is connected to a standard or reference cavity 20 which is closed by a piston 28 and this latter can be displaced by means of a micrometer screw 30 which provides an accurate means of measurement of the displacements of the piston 28. The fourth guide terminal is connected to a non-reflecting terminal 52 constituted by a matched load. A second magic-tee junction 100 is interposed between the junction 44 and the reference cavity 20. The two other guide terminals of said junction are connected in one case to a matched load 102 and in the other case to a crystal detector 104. A crystal detector 22 which is connected to the cavity 6 by the directional coupler 16 supplies an oscillograph 24, the horizontal sawtooth sweep voltage of which is available at one output.

Figure 2A:
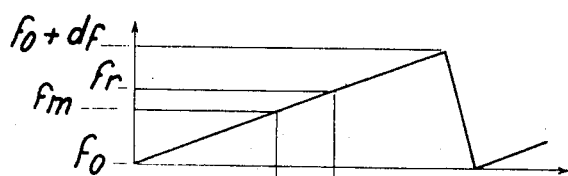
FIGS. 2A to 2G are very diagrammatic presentations of different waveforms which appear at the time of operation of the device of FIG. 1.

The horizontal sawtooth sweep voltage delivered by the oscillograph 24 is employed to produce a sawtooth frequency modulation of the oscillator 32 with a time T (FIG. 2A) which can be of the order of 1 msec in the case of an X-band oscillator. The sweep voltage derived from the oscillograph 24 is accordingly applied to an automatic frequency-control device 34 which imposes on the klystron oscillator 32 a frequency variation of the type illustrated in FIG. 2A. The extreme frequencies $f_o$ and $f_o + df$ are chosen so that the first limiting value should be lower than the range of variation of the resonant frequencies in the case of the cavities 20 and 6 and in the resonance mode which is adopted (the TE 112 mode, for example) and that the second limiting value should be higher than these frequencies. In the case of a reflex klystron generator, the frequency-control device 34 can produce action in particular on the voltage applied to the reflector.

The output signal of the generator 32 is applied simultaneously to the test cavity 6 and to the resonant cavity 20 which operates in a transmission mode. There are thus obtained two pulses which vary in time with respect to the origin of the sawteeth if the frequency of the cavities varies as will be explained hereinafter.

Figure 2B:
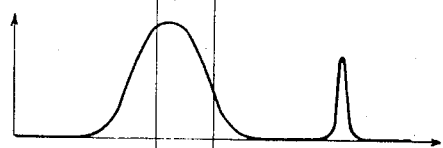
Figure 2C:
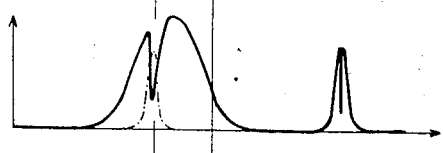
Figure 2D:
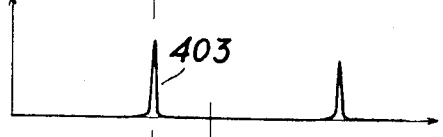
Figure 2E:
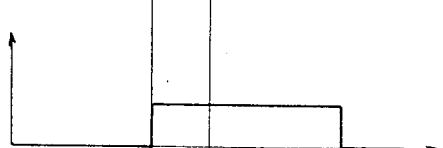

The signals delivered by the detectors 22 and 104 which are respectively associated with the test cavity 6 and with the reference cavity 20 are transmitted to processing networks 401 and 402. Each network is intended to supply a pulse at the time of transition of the frequency of the klystron generator 32 to the resonant frequency $f_m$ or $f_r$ of the corresponding cavity. The mode of formation of said pulse is illustrated diagrammatically in FIGS. 2B and 2C : the power delivered by the generator during the sawtooth sweep has a waveform which is shown in FIG. 2B. The power which is reflected by the test cavity 6 has a very distinct minimum at the point of transition to the resonant frequency $f_m$ (FIG. 2C). Correlatively, the power transmitted to the detector 22 is provided in the form of a pulse (as shown in chain-dotted lines in FIG. 2C). The corresponding pulse 403 supplied by the detector 22 (FIG. 2D) is applied to the processing network 401 which comprises in particular a bi-stable device or flip-flop. Each pulse 403 changes the state of the flip-flop which is restored to its initial state by the pulses which appear at the end of the sawteeth and are derived from the sweep generator. The current which is supplied by the processing network 401 thus has the waveform shown in FIG. 2E.

Figure 2F:
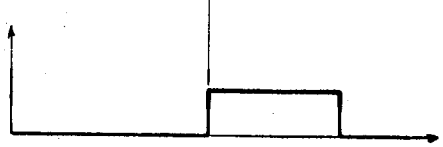

Similarly, the flip-flop processing network 402 delivers an output signal of the type illustrated in FIG. 2F and triggering corresponds to transition of the generator to the resonant frequency $f_r$ of the reference cavity 20.

Figure 2G:
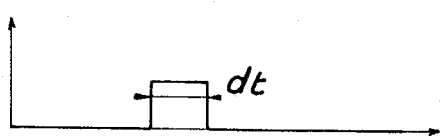

The outputs of the processing networks 401 and 402 are applied to the inputs of a follow-up control circuit 404 comprising an input differential amplifier : this amplifier circuits controls the motor 108 and causes this latter to rotate in a direction corresponding to nullification of the time interval dt during which the differential amplifier delivers a voltage (FIG. 2G). The potentiometer 110 which is associated with the micrometer 30 indicates the position of the piston 28 which repeats the displacements of the piston 4.

If the pistons 4 and 28 are intended to carry out substantial displacements corresponding to a variation of frequency of the generator 32 which is greater than the possible tuning range of said generator, a switching circuit 405 (as shown in FIG. 1) can be provided for displacing the range of frequency oscillation by a predetermined amplitude.

In addition, provision is made between the amplifier circuit 404 and the input servo-motor 108 for a manually operated switch 406 which serves to open the control loop at the time of preliminary adjustments.

The operation of the device will already have become clear from the foregoing and will now be described only in brief outline. The switch 406 being open, the preliminary adjustment consists in adjusting the band of frequencies of the klystron about the mean resonant frequency of the test cavity 6, then in bringing the resonant frequency of the reference cavity 20 into the same band. The switch 406 can then be closed and the operation becomes fully automatic.

It is apparent that the initial operation of the device, in particular during the preliminary adjustment stage, is distinctly more straightforward than in the case of the device according to British Pat. No 1 197 699. Moreover, the device itself is of much simpler design since it comprises only one control loop instead of two.

Figure 3:
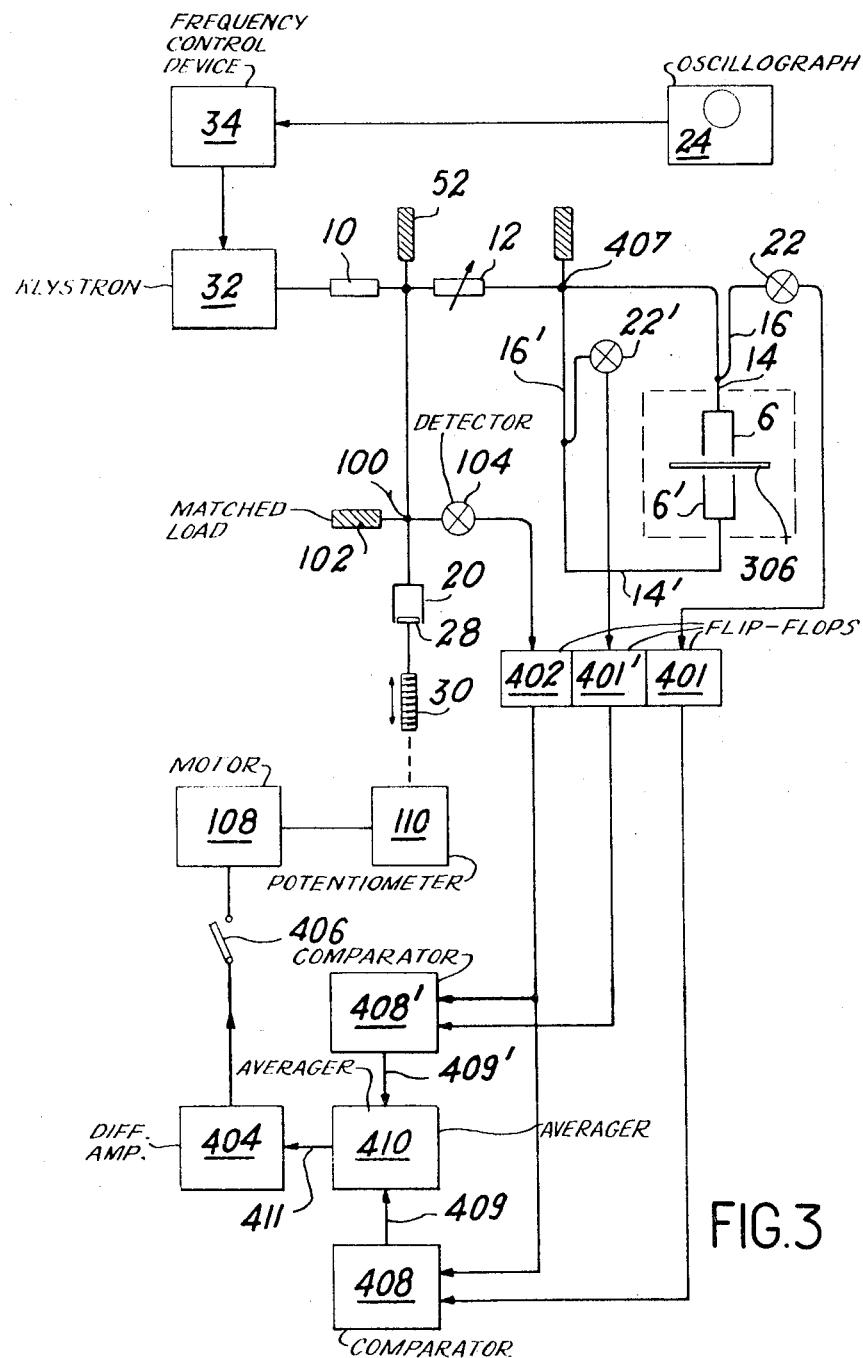
FIG. 3 is a block diagram of a second embodiment of the device according to the invention which is intended to measure the thickness of an object such as a sheet metal plate which forms the movable wall of two resonant cavities, the object being placed so that the resonant frequencies of both cavities should be of the same order of magnitude.

The embodiment of the invention which is illustrated in FIG. 3 is intended for measuring the thickness of a conductive strip. The opposite faces of said strip (of sheet steel, for example) are employed as movable walls of two symmetrically disposed test cavities in accordance with an arrangement which is described and claimed in British Pat. application No 9630/70. In order to ensure greater clarity, the elements which are illustrated in FIG. 3 and which correspond to those already described in British Pat. application No 9630/70 are given the same reference numerals. Furthermore, the same reference numerals are also assigned to the corresponding elements of FIGS. 1 and 3.

In the arrangement which is illustrated in FIG. 3, there is again shown a generator 32 which is frequency-modulated in a sawtooth waveform under the action of signals received from the oscillograph 24. The microwave derived from the generator 32 is applied on the one hand to the reference cavity 20 and on the other hand to two test cavities 6 and 6' which are mounted in an identical manner and in oppositely facing relation (thereby entailing the need for an additional magic-tee junction 407). Each sheet-metal strip or plate 306 whose thickness is to be measured is inserted in turn between the cavities 6 and 6' in a substantially central position in order that the resonant frequencies $f_m$ and $f'_m$ should be substantially the same. In the case of each cavity, the plate 306 performs the same function as the piston 4 of the embodiment of FIG. 1.

The signals delivered by the detectors 104, 22 and 22' which are associated respectively with the cavities 20, 6 and 6' drive respectively the flip-flop circuits 402, 401 and 401'. Provision is made for two comparator circuits 408 and 408' and the signals having the waveform illustrated in FIGS. 2E and 2F and derived from the flip-flop circuits 401 and 402 are applied to the comparator circuit 408 whilst the signals derived from the flip-flop circuits 401' and 402 are applied to the comparator circuit 408'. These comparator circuits therefore deliver at their outputs 409 and 409' signals having the waveform which is illustrated in FIG. 2G but corresponding to time intervals dt which are slightly different if the plate 306 does not take up a strictly centered position between the cavities, with the result that said cavities have slightly different resonant frequencies $f_m$ and $f'_m$. The outputs 409 and 409' supply a circuit 410 which delivers at its output 411 square-waves having a width which is the mean value of the time intervals dt of the two input signals. This output signal is applied to the follow-up control circuit 404. Displacement of the piston 28 is then carried out by said control circuit until the resonant frequency $f_r$ of the reference cavity 20 assumes a value which is the mean value of the frequencies $f_m$ and $f'_m$.

If it is assumed (and in practice this proves to be the case to within a sufficient degree of approximation) that the resonant frequency $f_m$ or $f'_m$ of a cavity varies linearly with the distance between the plate 306 and the end-wall of said cavity, the positional variations of the piston 28 will represent one-half the difference in thickness between two successive plates 306 which are disposed between the cavities 6 and 6'. Furthermore, any possible transverse vibrations of the plate will have no incidence on the measurement.

It can readily be appreciated that the device in accordance with the present invention is much simpler than the device described and claimed in British Pat. application No. 9630/70. In fact, the device of FIG. 3 has only one microwave generator 32 instead of three and a single control loop instead of three. The accuracy of measurement does not achieve quite the same high standard but remains wholly satisfactory in the majority of cases.

We claim:

1. A device for measuring the thickness of a conductive strip, comprising:
   two test cavity resonators located substantially symmetrically on opposite sides of said strip, opposite sides of said strip constituting one wall of each of said test cavities,
   a microwave reference cavity resonator having a movable wall,
   a microwave generator for supplying microwave energy to said test cavities and to said reference cavity,
   means for generating a sawtooth voltage and frequency modulating said microwave generator by said sawtooth voltage,
   two first detector means each associated with a respective one of said test cavities for detecting transmission of microwave power by said respective one of said test cavities,
   second detector means associated with said reference cavity for detecting transmission of power by said reference cavity,
   actuating means for moving said movable wall of said reference cavity, means responsive to the time difference between occurrence of microwave transmission of microwave power by said reference cavity and the average time of occurrences of microwave transmissions by said two test cavities for controlling said actuating means in a direction to bring said time difference to zero.

2. A device according to claim 1, wherein said control means comprise:
   two first flip-flop circuits each connected to a respective one of said first detector means and being set in response to transmission of power through the respective one of said test cavities during each sawtooth voltage and reset at the end of each sawtooth voltage,
   a second flip-flop circuit connected to said second detector means being set in response to transmission of power through said reference cavity during each sawtooth voltage and reset at the end of each sawtooth voltage,
   and comparator means controlling said actuating means, said comparator means providing control signals each in proportion to the time difference between settings of said second flip-flop circuit during a sawtooth voltage and one-half the interval between the settings of said two first flip-flop circuits during the same sawtooth voltage.

* * * * *